Feb. 10, 1931.    W. HENNING    1,791,868
AIRPLANE
Filed March 12, 1930

Inventor
WILLIAM HENNING
By Barker & Collings
Attorney.

Patented Feb. 10, 1931

1,791,868

UNITED STATES PATENT OFFICE

WILLIAM HENNING, OF WASHINGTON, DISTRICT OF COLUMBIA

AIRPLANE

Application filed March 12, 1930. Serial No. 435,197.

My invention relates to airplanes, having for its object to produce a practical apparatus of this nature in which it is possible to change the center of gravity of the machine as a whole in fore and aft directions; and it consists in improvements in the construction and the combination of certain of the main features of the apparatus, as will be hereinafter pointed out.

In the accompanying drawings which are largely diagrammatic in character:

Figure 1:
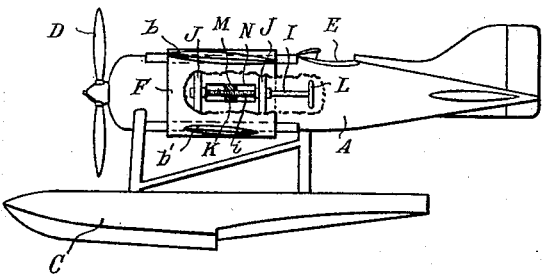
Figure 1 is a side view, partly broken away, of an airplane of the hydroplane type to which is applied the present invention.
Figure 2:
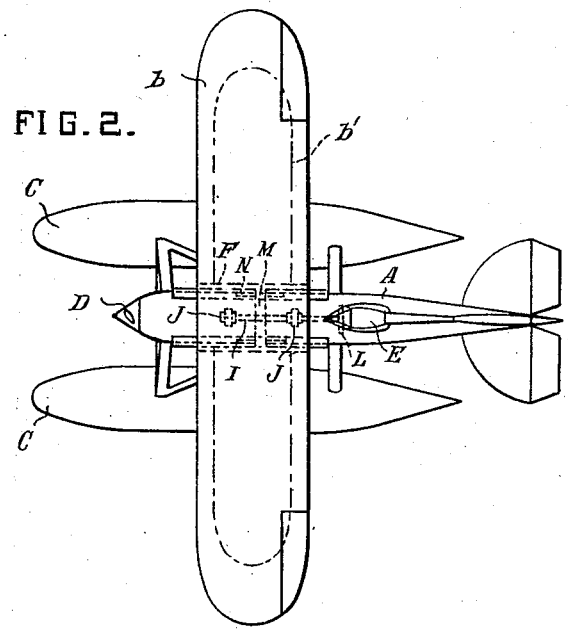
Figure 2 is a top plan view of the same.
Figure 3:
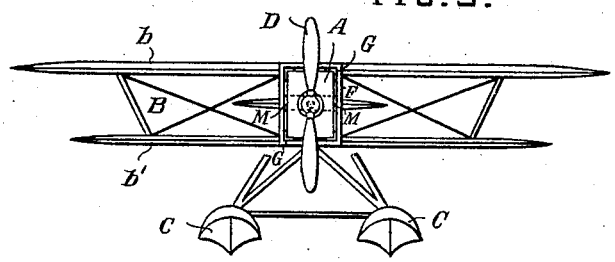
Figure 3 is a front view.

Referring to these drawings, A designates the fuselage of the machine, it being provided with the usual features of an airplane including those for propelling and for steering. A machine with but a single motor and propeller D has been chosen for purposes of illustration. The wing frame B may be of usual or approved construction in its main features, that shown being of the biplane type with upper and lower wings $b$ $b'$. The landing gear is represented as consisting of a pair of pontoons, C. For these, however, might be substituted a wheeled landing gear. The fuselage is represented as provided with a cockpit E to accommodate a single pilot; but in larger machines than that represented, the fuselage will be provided with an enclosed cabin capable of accommodating two or more operators. The parts so far described are of well known construction and may be varied from what is indicated in the drawings to a very wide extent, as my invention is applicable to practically all types and kinds of airplanes of present day construction.

In the longitudinal, axial center of the wing frame, there is formed a guide-way or frame F located between the upper and lower wings. This guide-way is of a size and shape to permit the fuselage to be slipped through it and to move therein along fore and aft lines. To support the fuselage within this frame and to permit it to be easily moved there may be provided a plurality of rails G which I have represented as being carried by the fuselage, preferably at the four corners thereof when it is of rectangular construction as represented. This arrangement permits the fuselage to be located at the center of the wing frame; and gives to it practically all round outside support, while permitting it to be freely moved, under the direction or control of the pilot, along fore and aft lines. Various means may be adopted for shifting the wing frame and fuselage relative to each other, that represented, and which I prefer, comprising a longitudinal shaft I, strongly held in supports J carried by the fuselage. This shaft is provided with a threaded portion $i$ that engages with a nut K, carried by supports M extending from the guide frame F. The walls of the fuselage are slotted, as indicated at N, to permit the passage of the supports M and to allow for the relative movements of the two parts of the airplane— the wing frame and the fuselage. As a means for controlling the movements of the shaft I and through which to control the fore and aft relative movements of the two frames, a hand wheel L, at the rear end of the shaft and located within the cockpit, is represented. This showing it will be understood, is diagrammatic, and in practice, motor-driven means for turning the shaft might be employed in lieu of the hand wheel.

It is recognized that one of the chief dangers of aeronautical flight lies in the stalling of the engine with the incident danger of the machine going into a nose dive or a tail spin, and hence getting out of control of the pilot. It is recognized that this loss of control can be prevented or largely reduced if the center of gravity of the machine is shifted fore or aft as circumstances may require, and attempts have heretofore been made to provide for such changing of the center of gravity. My invention I believe to be an improvement over anything heretofore proposed along this line, in that it provides for the proper and most advantageous location of the fuselage with reference to the wing frame, while at the same time permitting relative longitudinal movements of these two parts, and also furnishing a frame arrangement that adds strength to the wing frame and gives full outside support to the fuselage, along lines of considerable extent and that cover the longitudinal center of gravity of the fuselage itself. This I secure by providing a box-like or enclosing frame into which the fuselage is inserted, by which it is supported and within which it is movable as has been described.

It will be seen that the guides between the fuselage and enclosing frame in which it moves are longer than the fore and aft dimensions of the wings, thus giving to the fuselage exterior support of sufficient length to be practically effective both for guiding and supporting purposes.

What is claimed is:

1. In an airplane construction, a wing frame, a fuselage, an enclosing frame carried by the wing frame and surrounding the fuselage and furnishing exterior support therefor, the fuselage being movable in fore and aft directions inside the enclosing frame, and means for effecting such movement.

2. In an airplane of biplane construction, a wing frame, an independent fuselage, an enclosing frame carried by the wing frame and located centrally between the wings thereof, such enclosing frame surrounding the fuselage and furnishing exterior support therefor, and the fuselage being movable in fore and aft directions inside the enclosing frame, and means for effecting such movement.

3. In an airplane construction, a wing frame, a fuselage, an enclosing frame carried by the wing frame and centrally located relative thereto, such enclosing frame surrounding that portion of the fuselage enclosing the center of gravity thereof, the fuselage being independent of the wing and enclosing frames and movable on fore and aft lines therein, guides located between the enclosing frame and fuselage giving exterior support to the latter and directing its movements, and means for effecting movements of the wing frame and fuselage relative to each other.

4. In an airplane construction, a wing frame, an independent fuselage, an enclosing frame carried centrally by the wing frame surrounding the fuselage, guides carried by the surrounding frame giving exterior support to the fuselage and directing its longitudinal movements in said surrounding frame, the guides being longer than the dimensions of the wings in fore and aft directions, and means for effecting relative fore and aft movements between the fuselage and the wing frame.

5. In an airplane construction, a wing frame, an independent fuselage, an enclosing frame carried by the wing frame and surrounding the fuselage and furnishing exterior support therefor, the fuselage being movable inside the enclosing frame, which serves to give direction to its movements on fore and aft lines, and means for effecting such movements comprising a screw shaft under control of the pilot and a nut engaging therewith, these means being supported one by the fuselage and the other by the surrounding frame.

In testimony whereof I affix my signature.

WILLIAM HENNING.